US012202531B2

(12) United States Patent
Michel et al.

(10) Patent No.: US 12,202,531 B2
(45) Date of Patent: Jan. 21, 2025

(54) METHOD FOR CALCULATING AN INSTANTANEOUS VELOCITY VECTOR OF A RAIL VEHICLE AND CORRESPONDING SYSTEM

(71) Applicant: IXBLUE, Saint-Germain-en-Laye (FR)

(72) Inventors: Jean-Philippe Michel, Saint-Germain-en-Laye (FR); Pierre D'Harcourt, Saint-Germain-en-Laye (FR)

(73) Assignee: EXAIL, Saint-Germain-en-Laye (FR)

( * ) Notice: Subject to any disclaimer, the term of this patent is extended or adjusted under 35 U.S.C. 154(b) by 239 days.

(21) Appl. No.: 17/925,949

(22) PCT Filed: May 18, 2021

(86) PCT No.: PCT/EP2021/063132
§ 371 (c)(1),
(2) Date: Nov. 17, 2022

(87) PCT Pub. No.: WO2021/233912
PCT Pub. Date: Nov. 25, 2021

(65) Prior Publication Data
US 2023/0182790 A1    Jun. 15, 2023

(30) Foreign Application Priority Data

May 19, 2020  (FR) ...................... 2005112

(51) Int. Cl.
*B61L 25/02*    (2006.01)
*B61L 15/00*    (2006.01)
(Continued)

(52) U.S. Cl.
CPC ......... *B61L 25/021* (2013.01); *B61L 15/0072* (2013.01); *B61L 15/0081* (2013.01);
(Continued)

(58) Field of Classification Search
CPC .... B61L 25/021; B61L 25/023; B61L 25/026; B61L 15/0072; B61L 15/0081;
(Continued)

(56) References Cited

U.S. PATENT DOCUMENTS 7,561,961 B2 *  7/2009  Wakamatsu ............ G01S 19/49
340/995.18
7,966,126 B2 *  6/2011  Willis .................... B61L 25/025
340/995.25
(Continued)

FOREIGN PATENT DOCUMENTS

EP    3 159 701    4/2017

OTHER PUBLICATIONS

International Search Report for PCT/EP2021/063132, mailed Sep. 1, 2021, 6 pages.
(Continued)

*Primary Examiner* — Hai H Huynh
(74) *Attorney, Agent, or Firm* — NIXON & VANDERHYE

(57) ABSTRACT

In a method for calculating, by an estimator, an instantaneous velocity vector $\vec{V}_u$ of a rail vehicle, the estimator receives measurements from an inertial unit at a fixed point in the vehicle body and determines a mathematical model M of the dynamics of the vehicle moving on a track, the model being dependent on the bias of the inertial unit and installation parameters, a virtual sensor is determined based on the model M, the virtual sensor enabling calculation, from model parameters, two theoretical transverse velocities $\delta v_{y_c}$ and $\delta v_{z_c}$ along axes $y_c$ and $z_c$, respectively. An iterative estimator calculates $\vec{V}_u$, and includes the virtual sensor, the estimator being configured so the two theoretical transverse velocities are zero regardless of the rail configurations, the (Continued)

estimator enabling correction of the biases of the inertial unit and estimate installation parameters. Auxiliary velocity or distance travelled sensors are not used to calculate $\vec{V}_u$.

20 Claims, 2 Drawing Sheets

(51) Int. Cl.
    *G01P 7/00*     (2006.01)
    *G01P 21/02*     (2006.01)
(52) U.S. Cl.
    CPC ........... *B61L 25/023* (2013.01); *B61L 25/026* (2013.01); *G01P 7/00* (2013.01); *G01P 21/02* (2013.01); *B61L 2205/04* (2013.01)
(58) Field of Classification Search
    CPC ........ B61L 2205/04; G01P 7/00; G01P 21/02; G01P 15/00
    USPC ...................................................... 701/19, 20
    See application file for complete search history.

(56) References Cited

U.S. PATENT DOCUMENTS

| | | | |
|---|---|---|---|
| 8,024,119 B2* | 9/2011 | Zeng | G01C 21/1654 |
| | | | 702/95 |
| 9,600,609 B2* | 3/2017 | Yamagata | G06F 30/20 |
| 2003/0216865 A1 | 11/2003 | Riewe et al. | |

OTHER PUBLICATIONS

Written Opinion of the ISA for PCT/EP2021/063132, mailed Sep. 1, 2021, 9 pages.
Reimer et al., "INS/GNSS/odometer data fusion in railway applications", 2016 DGON Intertial Sensors and Systems (/SS), IEEE, Sep. 20, 2016, pp. 1-14.

* cited by examiner

[Fig. 1]
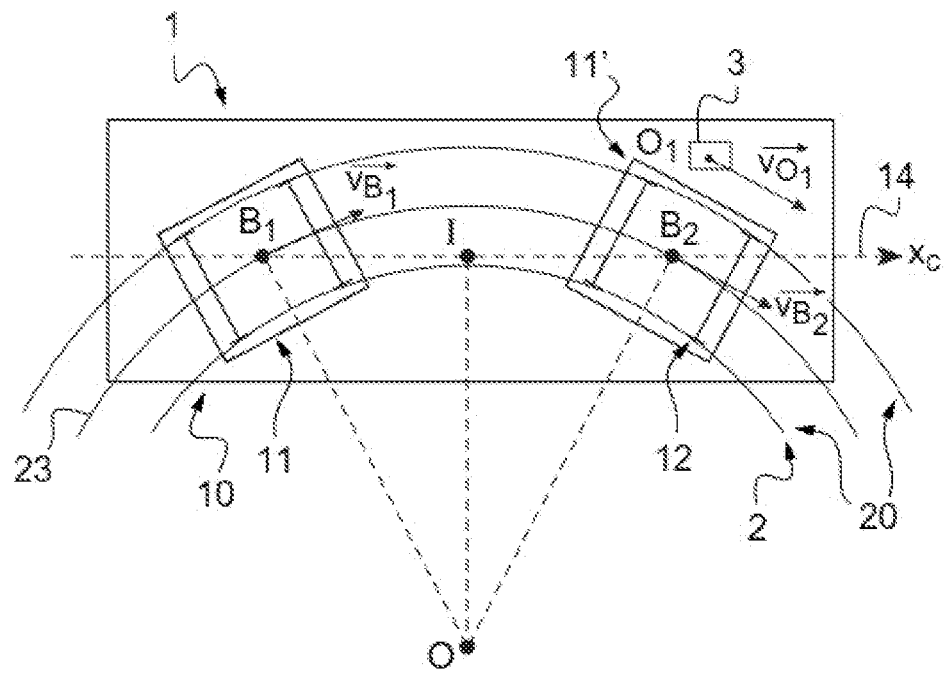
[Fig. 2]
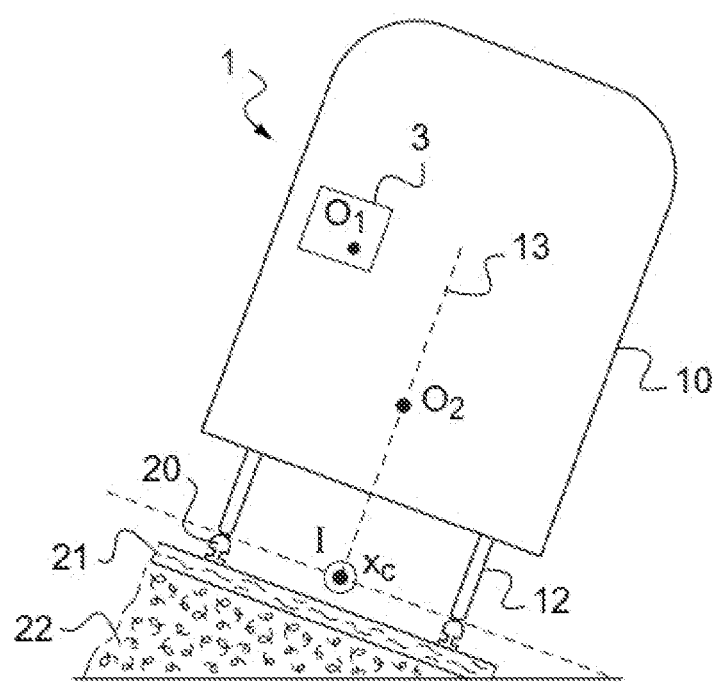

[Fig. 3]
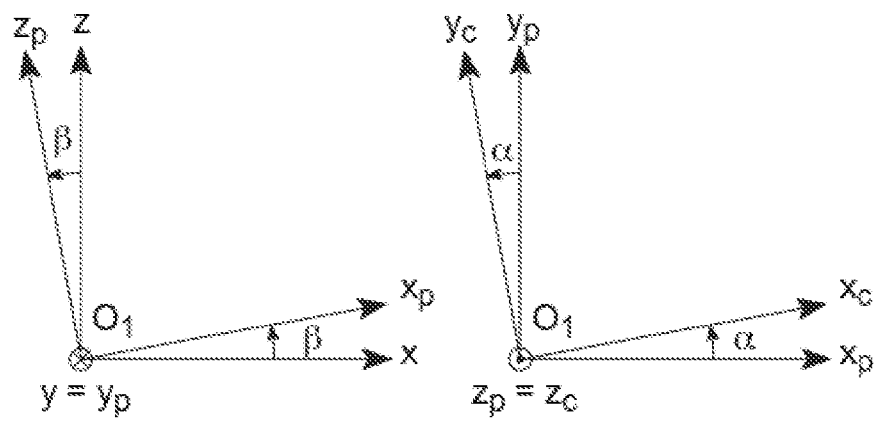
[Fig. 4]
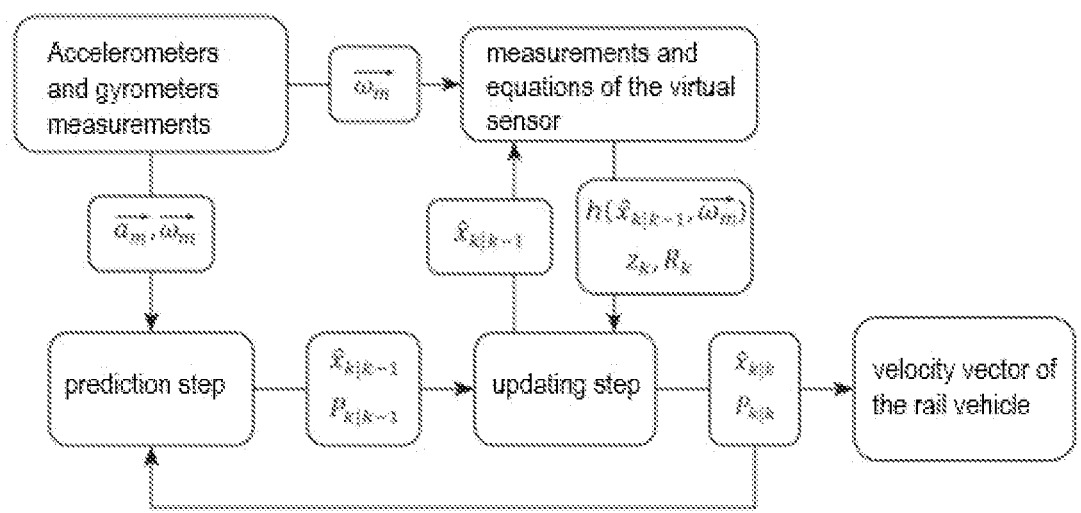

METHOD FOR CALCULATING AN INSTANTANEOUS VELOCITY VECTOR OF A RAIL VEHICLE AND CORRESPONDING SYSTEM

This application is the U.S. national phase of International Application No. PCT/EP2021/063132 filed May 18, 2021, which designated the U.S. and claims priority to FR Patent Application No. 2005112 filed May 19, 2020, the entire contents of each of which are hereby incorporated by reference.

TECHNICAL FIELD

The present invention generally relates to the railway field. It more particularly relates to a method for calculating an instantaneous velocity vector of a rail vehicle comprising an inertial unit as well as a corresponding system. It makes it possible to obtain velocity estimations from measurements of an inertial unit, independently of other measurement devices. It potentially also makes it possible to calculate an acceleration vector. It then makes it possible to determine in particular the attitude and/or movement of the rail vehicle. The estimations obtained may serve to pilot the vehicle and/or to locate it.

TECHNOLOGICAL BACKGROUND

Today, rail vehicle location in Europe and in particular in France, in order to ensure circulation safety, is ensured by equipment along the rails. They make it possible to divide the railway into block sections in which, under normal circumstances, there must be only one train at the same time. The European regulation ERTMS/ETCS (European Rail Traffic Management System/European Train Control System), whose standards are also used by countries such as Russia or China, is deployed according to this methodology.

The purpose of train location is usually to find out the track and the distance travelled rather than the geographical coordinates (latitude, longitude and altitude). A ground train detection system, such as rail circuits or axle counters, is associated with each block section in order to define the status thereof, free or occupied. Beacons placed upstream from the block section entry signals can communicate signalling data to the train and provide it with position information. Velocity or travelled-distance sensors, such as a wheel sensor, a radar or a Doppler radar on board the rail vehicle, make it possible to calculate the distance travelled by the latter between two beacons. These systems require periodic recalibrations and can also be disturbed by external phenomena such as weather conditions (for example, skidding) or the presence of obstacles such as a bridge or a tunnel.

Rail odometry is generally based on wheel sensors whose velocity information is strongly degraded in the presence of slip between the wheels and the rails. This occurs especially during the phases of acceleration or braking of the rail vehicle, and also as a function of the weather conditions or the season (for example, presence of fallen leaves on the rails).

To remedy this, it has been proposed in EP 2 219 930 B1 to use two wheel sensors hybridized with an accelerometer placed along the axis of travel of the rail vehicle, in order to improve the front velocity measurement, the velocity vector not being estimated in this document. The matter is in particular to detect the loss of adhesion in order to be robust to slip phases. It is nevertheless necessary to couple the accelerometer with an external database providing the slope and curvature of the rails. Moreover, the estimation of the accelerometer bias is not mentioned.

The document EP 2 749 471 B1, as for it, relates to the use of inertial sensors in order to measure the angular velocity along three orthogonal axes and the acceleration along the direction of travel. The accelerometer measurement is associated with that of the angular velocity in order to take the earth's attraction into account when calculating the longitudinal acceleration of the rail vehicle. The integration of this acceleration then makes it possible to evaluate the velocity thereof along its axis of travel as well as the distance travelled. The accelerometer bias can be evaluated when the rail vehicle is stopped. However, when in motion, a wheel sensor is necessary to estimate this bias over a time period during which the wheel does not slip with respect to the rail. An angular velocity substantially constant over a predetermined duration is observable along a non-zero constant curvature or during a constant evolution of the slope or superelevation of the railway. Such an angular velocity corresponds to a bias that is then corrected.

The document EP 3 159 701 B1 discloses a method for calculating the proper acceleration linked only to the travel of a rail vehicle along the railway using an inertial unit. In the same way as for the previous document, its calculation is made using the real acceleration and the taking into account of the gravitational force linked to the rail configuration. The estimation of the rail vehicle travel velocity is made using a spectral analysis of the real accelerations measured along a vertical axis. This estimation improves the calculation of the proper acceleration. The estimator uses the measurements of the inertial unit in correction equations. Prediction equations are mentioned but they are based on non-explicit movement hypotheses. This architecture is not optimum for a gyrocompass inertial unit. The latter document also describes the estimation of the gyrometer biases along at least two axes, but it does not mention the accelerometer biases.

The article of REIMER C ET AL: "INS/GNSS/odometer data fusion in railway applications", 2016 DGON INERTIAL SENSORS AND SYSTEMS (188), IEEE, September 2016 (2016-09-20), pages 1-14, XP033004824 is also known, which describes a system implementing the coupling of an inertial unit with a virtual sensor that provides null velocities along two axes transverse to the rail vehicle, corrected for the misalignment angles $\alpha$ and $\beta$. However, in this system, the inertial unit is continuously coupled to a wheel sensor and this makes it possible to perform a measurement of the full velocity vector with the measurement of the wheel sensor along the front axis and null measurements along the two transverse axes corrected for the misalignment angles $\alpha$ and $\beta$. This measurement is performed at the wheel sensor by taking into account its leverage arm with the inertial unit. An additional misalignment matrix proportional to the heading variation makes it possible to take into account the rotation between the bogie on which the odometer is located and the body. On the other hand, the leverage arm effects due to the difference between the real position of the inertial unit and its ideal position in the body are not taken into account. Finally, the transient transverse components caused by the switches and the connections, that is to say the terms $\gamma_y$ and $\gamma_z$, are not taken into account in this system.

It would be useful to have a system calculating the three-dimensional instantaneous velocity of the rail vehicle without using information from an auxiliary physical velocity or travelled-distance sensor or from outside the vehicle, which does not risk to be disturbed and which requires no periodic calibration, contrary to the known systems. It would be useful for the system to be self-calibrated in order to avoid the need for staff to perform tedious calibration operations. It would be preferable that this instantaneous velocity calculation system does not either require the use of a database, such as a railway map, in order to avoid the problems of updating, reliability, accuracy and storage of such a database.

It can nevertheless be useful that the instantaneous velocity calculation system can be associated with additional calculation means and with external sensors, for example a GPS or equivalent and/or an auxiliary physical velocity or travelled-distance sensor, or even a database in order to improve the accuracy of the results obtained and/or to calculate other useful information based of the three-dimensional instantaneous velocity obtained, as for example the three-dimensional movement of the rail vehicle, the instantaneous position, the travel . . . . In any case, these external sensors, including the auxiliary physical velocity or travelled-distance sensor, are not part of the system and are not necessary to the method for calculating the instantaneous velocity of the rail vehicle.

DISCLOSURE OF THE INVENTION

The invention proposed is based on the implementation, in a rail vehicle body, of an inertial unit and a virtual sensor within an estimator, the virtual sensor calculating virtual measurements of two transverse velocities along two axes transverse to the body, and in which estimator it is considered that these two transverse velocities are zero in all the rail configurations, the parameters calculated within the estimator based on the inertial unit measurements and as a function of a model of the vehicle, being adjusted and corrected iteratively in order to respect this condition. The two transverse velocities are measured virtually along two axes perpendicular to each other and to the $x_c$ axis of the vehicle body. The virtual sensor is constructed on the basis of a model of the vehicle corresponding to the dynamic response of a rail vehicle moving on a railway, wherein the rail vehicle can be a generic vehicle or, preferably, the vehicle specifically implemented to apply the invention. The system of the invention allows a self-calibration using the characteristics of the rail layout and the effects thereof on the rail vehicle dynamics.

More precisely, it is proposed according to the invention a method for calculating, by an estimator, an instantaneous velocity vector, $\vec{V}_u$, of a rail vehicle capable of moving along a railway, the vehicle having a body, the body being arranged on two bogies, the bogies having wheel axles rolling on rails of the railway, the contacts of the wheels on the rails defining a rolling plane of the vehicle, each bogie being articulated to the body at least in rotation about a rotation axis, the body being capable of undergoing a roll movement about a roll axis, the estimator receiving as an input measurements from an inertial unit installed at a fixed point of the body, the inertial unit comprising accelerometers and gyrometers and making it possible to produce measurements in an orthonormal reference system x, y, z centred on a point $O_1$ located in the inertial unit, the estimator calculating as an output the instantaneous velocity vector, $\vec{V}_u$, of the rail vehicle, wherein:
with $B_1$ and $B_2$ two points located at the intersections of the rotation axes of the bogies and the rolling plane of the vehicle,
with $x_c$, $y_c$, $z_c$, a fixed orthonormal reference system of the vehicle body in which $x_c$, corresponds to a longitudinal axis of the body, passing through points $B_1$ and $B_2$, said $x_c$, axis being colinear to the vehicle instantaneous velocity vector $\vec{V}_u$ during a rectilinear travel with constant superelevation of the vehicle,
a mathematical model M of the dynamics of the vehicle moving on a railway is determined, said model being function of biases of the inertial unit and of installation parameters,
on the basis of model M, a virtual sensor is determined, making it possible to calculate, from parameters of the model, two theoretical transverse velocities, $\delta v_{y_c}$, along $y_c$ axis and $\delta v_{z_c}$ along $z_c$ axis,
an iterative estimator for calculating the instantaneous velocity vector $\vec{V}_u$, and comprising the virtual sensor is implemented, the estimator being configured in such a way that the two theoretical transverse velocities are zero whatever the railway configuration, the estimator making it possible to correct the inertial unit biases and to estimate installation parameters, and
wherein no auxiliary physical velocity or travelled-distance sensor is implemented for calculating the instantaneous velocity vector $\vec{V}_u$.

Other non-limiting and advantageous features of the method according to the invention, taken individually or according to all the technically possible combinations, are the following:
the virtual sensor is obtained based on a model M($\overrightarrow{O_1O_2}$, $\alpha$, $\beta$, $\vec{v}_{O_1}$, $\vec{\omega}$, $\delta v_{y_c}$, $\delta v_{z_c}$) of the vehicle, and the parameters enabling the virtual sensor to calculate the two theoretical transverse velocities are: $\overrightarrow{O_1O_2}$, the vector connecting point $O_1$ to point $O_2$, where point $O_2$ is a point considered located at the intersection between the body roll axis and a plane orthogonal to $x_c$ located at equal distance of the two points $B_1$ and $B_2$, or is a point considered close to said intersection, said point $O_2$ being then a point located at a determined distance D about said intersection of the body roll axis and the plane orthogonal to $x_c$ located at equal distance from the two points $B_1$ and $B_2$, D being lower than 1 m, $\alpha$ the heading misalignment angle between x axis and $x_c$ axis, $\beta$ the pitch misalignment angle between x axis and $x_c$ axis, a velocity vector $\vec{v}_{O_1}$ at point $O_1$, a rotation vector $\vec{\omega}$ of the body with respect to the terrestrial reference system, the parameters $\overrightarrow{O_1O_2}$, $\alpha$, $\beta$ being the installation parameters, the estimator making it possible to correct the biases created by the inertial unit both by the misalignment angles $\alpha$, $\beta$, and by the leverage arm $\overrightarrow{O_1O_2}$,
the estimator further calculates one or several of: an instantaneous rotation vector $\vec{\omega}_u$, a movement of the vehicle, a position of the vehicle, an attitude of the vehicle, standard deviations of the values calculated by the estimator, for calculating the vehicle position, the initial position of the vehicle is provided, the inertial unit is installed in the vehicle body in such a way that the x axis of the inertial unit is inclined at most in a cone of 5° with respect to the $x_c$ axis of the vehicle body, or else a previous calibration is performed, and then, during the calculation of at least the instantaneous velocity vector V by the estimator, the inertial unit measurements are processed in such a way that the measurements produced by the inertial unit and processed correspond to those of an inertial unit that would have been installed in such a way that the x axis of the inertial unit is inclined at most in a cone of 5° with respect to the $x_c$ axis of the vehicle body, $\delta v_{y_c}$ and $\delta v_{z_c}$ are calculated on the basis of the vehicle model $M(\overrightarrow{O_1O_2}, \alpha, \beta, \overrightarrow{v_{O_1}}, \overrightarrow{\omega}, \delta v_{y_c}, \delta v_{z_c})$ by:

$$\begin{cases} \delta v_{y_c} = -\alpha(v_{O_{1_x}} + \omega_y O_1 O_{2_z} - \omega_z O_1 O_{2_y}) + v_{0_{1_y}} + \omega_z O_1 O_{2_x} - \omega_x O_1 O_{2_z} \\ \delta v_{z_c} = \beta(v_{O_{1_x}} + \omega_y O_1 O_{2_z} - \omega_z O_1 O_{2_y}) + v_{0_{1_z}} + \omega_x O_1 O_{2_y} - \omega_y O_1 O_{2_x} \end{cases}$$

the parameters enabling the virtual sensor to calculate the two theoretical transverse velocities $\delta v_{y_c}$ and $\delta v_{z_c}$ further include the inter-bogie distance $B_1B_2$, and in that $\delta v_{y_c}$ and $\delta v_{z_c}$ are calculated on the basis of a model $M(\overrightarrow{O_1O_2}, \alpha, \beta, B_1B_2, v_{O_1}, \overrightarrow{\omega}, \delta v_{y_c}, \delta v_{z_c})$ of the vehicle by:

$$\begin{cases} \delta v_{y_c} = -\alpha(v_{O_{1_x}} + \omega_y O_1 O_{2_z} - \omega_z O_1 O_{2_y}) + v_{0_{1_y}} + \\ \quad \omega_z O_1 O_{2_x} - \omega_x O_1 O_{2_z} + \gamma_y \\ \delta v_{z_c} = \beta(v_{O_{1_x}} + \omega_y O_1 O_{2_z} - \omega_z O_1 O_{2_y}) + v_{0_{1_z}} + \\ \quad \omega_x O_1 O_{2_y} - \omega_y O_1 O_{2_x} + \gamma_z \end{cases}$$

where $\gamma$ corresponds to a transient transverse velocity depending on $v_{O_1}$, the time variations of $\overrightarrow{\omega}$ and the inter-bogie distance $B_1B_2$, at least one of the installation parameters $\overrightarrow{O_1O_2}$, $\alpha$ and $\beta$, and possibly $B_1B_2$, is initialized in the estimator by a measurement of said parameter in-situ in the vehicle body, at least one of the installation parameters $\overrightarrow{O_1O_2}$, $\alpha$ and $\beta$, and possibly $B_1B_2$, is initialized in the estimator by a measurement of said parameter in-situ in the vehicle body and said installation parameter is not estimated in the estimator, in the estimator, the virtual velocity sensor is configured to calculate instantaneous transverse velocities or, then, transverse velocities integrated over the duration $$\frac{1}{f_{maj}}$$

of the updating step, with $f_{maj}$ the estimator updating frequency, an estimator including a Kalman filter is implemented, a gyrocompass inertial unit is implemented, the vehicle includes a main median anteroposterior axis of its body, the $x_c$ axis of the vehicle body is supposed parallel to the main median anteroposterior axis of the vehicle body, during the installation of the inertial unit in the vehicle body, it is assumed that the $x_c$ axis is parallel to the main median anteroposterior axis of the vehicle body, during the installation of the inertial unit in the vehicle body, it is assumed that the main median anteroposterior axis of the vehicle body is parallel to the instantaneous velocity vector of the vehicle during a rectilinear travel with constant superelevation of the vehicle body.

The invention also relates to a system for calculating an instantaneous velocity vector, $\overrightarrow{V_u}$, of a rail vehicle capable of moving along a railway, the vehicle having a body, the body being arranged on two bogies, the bogies having wheel axles rolling on rails of the railway, the contacts of the wheels on the rails defining a rolling plane of the vehicle, each bogie being articulated to the body at least in rotation about a rotation axis, the body being capable of undergoing a roll movement about a roll axis, the system comprising an estimator of the instantaneous velocity vector, $\overrightarrow{V_u}$, the estimator calculating as an output the instantaneous velocity vector $\overrightarrow{V_u}$, of the rail vehicle, the estimator receiving as an input measurements from an inertial unit installed at a fixed point of the body, the inertial unit comprising accelerometers and gyrometers and making it possible to produce measurements in an orthonormal reference system x, y, z centred at a point $O_1$ located in the inertial unit, wherein:

with $B_1$ and $B_2$ two points located at the intersections of the rotation axes of the bogies and the rolling plane of the vehicle, with $x_c$, $y_c$, $z_c$, a fixed orthonormal system of the vehicle body in which the $x_c$ axis corresponds to a longitudinal axis of the body, passing through the points $B_1$ and $B_2$, said $x_c$ axis being colinear to the instantaneous velocity vector $\overrightarrow{V_u}$ of the vehicle during a rectilinear travel with constant superelevation of the vehicle, the system estimator is an iterative estimator that includes a virtual sensor determined on the basis of a mathematical model M of the dynamics of the vehicle moving on a railway, said model being function of biases of the inertial unit and of installation parameters, the virtual sensor making it possible to calculate, from model parameters, two theoretical transverse velocities, $\delta v_{y_c}$ along $y_c$ axis and $\delta v_{z_c}$ along $z_c$ axis, the estimator being configuration in such a way that the two theoretical transverse velocities are zero whatever the rail configurations, the estimator making it possible to correct the inertial unit biases and to estimate installation parameters, and the system having no auxiliary physical velocity or travelled-distance sensor to calculate the instantaneous velocity vector $\overrightarrow{V_u}$.

The system includes the inertial unit and the estimator.

Preferably, the estimator is a programmable calculator.

The programmable calculator advantageously comprises a microprocessor and/or a digital signal processor (DSP).

The invention finally relates to a computer program comprising a program code that, when said program code is executed in a programmable calculator, allows executing the method of the invention.

BRIEF DESCRIPTION OF THE DRAWINGS

FIG. 1 shows a schematical top view of a body of a rail vehicle inscribed in a curve in the railway, FIG. 2 shows a schematic cross-sectional view of rail vehicle body on a railway in superelevation, FIG. 3 shows a view schematizing, using the passage coordinate system $x_p$, $y_p$, $z_p$, the positive misalignment angles α and β for a rotation in the direct direction between the x axis of an orthonormal reference system x, y, z centred to a point $O_1$ of the inertial unit and the $x_c$ axis of the vehicle body, and FIG. 4 shows a schematical view of the system architecture based on the coupling of the gyrometer and accelerometer measurements with those of the virtual sensor within the framework of a Kalman filter producing in particular the velocity vector of the rail vehicle.

DETAILED DESCRIPTION OF AN EXEMPLARY EMBODIMENT

The following description in relation with the appended drawings, given by way of non-limiting examples, will allow a good understanding of what the method and system of the invention consist of and of how they can be implemented.

In its principle, the system of the invention comprises a fixed inertial unit that is fixed inside the body of a rail vehicle and whose measurements according to a reference system x, y, z are processed by an estimator in order to produce as an output at least the instantaneous velocity vector $\vec{V}_u$ of the vehicle. The system of the invention can further produce other results as an output and in particular the instantaneous rotation vector u and/or the attitude of the rail vehicle and/or its geographical position if its initial position is initially known. These output results are sampled as digital signals and are referenced with respect to the reference system $x_c$, $y_c$, $z_e$ attached to the body or to the geographical reference system.

The estimator implements a virtual sensor based on a mathematical model of the vehicle that uses a reference system $x_c$, $y_c$, $z_c$, that is fixed with respect to its body, the $x_c$, axis being colinear to the instantaneous velocity vector of the vehicle during a rectilinear movement with constant superelevation of the vehicle body. The estimator uses the fact that the two transverse velocities calculated by the virtual sensor along the two $y_c$ and $z_c$, axes that are transverses/perpendicular to the x, axis are always null, whatever the circulation configurations.

The estimator is configured to correct the biases of the inertial unit measurements and the effects created by the installation parameters (which may not be perfect) according to the principle that the two transverse velocities calculated by the virtual sensor are by principle null in all the traffic conditions.

Among these installation parameters, the following can be mentioned:

The imperfect orientation of the inertial unit with respect to the body, which has for effect to generate non-zero transverse velocities as soon as the vehicle is in motion, these velocities depending on the curvilinear velocity and on the two misalignment angles α, β, between the reference systems of the inertial unit and the vehicle body;

The position $O_1$ of the inertial unit reference system in the body with respect to a point $O_2$ located on the body roll axis between the two bogies, this difference having for effect to generate non-zero transverse velocities in presence of a non-zero curvature of the railway, a variation of the railway superelevation or declivity. These transverse velocities depend on the rotation velocity of the body circulating on the railway curvature and on the leverage arm $O_1O_2$ separating the inertial unit and the point $O_2$. It will be seen that this point $O_2$ can move as a function of the rail dynamics and that of these movements can potentially be taken into account;

The inter-bogie distance $B_1B_2$ that generates non-zero transverse velocities during a variation of the rail curvature, in particular during the passage over a diverging switch or a cubicle connection, but also during a non-linear variation of the declivity. These transverse velocities depend on the acceleration of the body rotation and on the inter-bogie distance and on the body velocity.

In the estimator, the virtual velocity sensor may be configured to provide instantaneous transverse velocities or transverse velocities integrated over the time pitch of the step of updating the navigation filter, this second possibility making it possible to reduce the measurement noise of the virtual sensor.

The estimator of the invention, which ensures a coupling between the inertial unit and the virtual sensor, implements a state estimator such as a Kalman filter. This estimator makes it possible to estimate and correct the following biases and parameters:

As regards installation parameters, firstly, the two misalignment angles α, β, between the axis of the inertial unit reference system and of the vehicle body reference system and more precisely between the x and $x_c$, axes, respectively, secondly, the three components of the leverage arm $O_1O_2$, in practice the vector: $\overrightarrow{O_1O_2}$ and, thirdly, the inter-bogie distance $B_1B_2$;

The biases $\vec{b}_a$ of the three accelerometers and the biases $\vec{b}_\omega$ of the three gyrometers constituting the inertial unit;

The standard deviations of all the states and in particular that of the velocity vector, and potentially, of other vectors calculated (e.g. rotation, attitude, movement) if additional calculations are performed.

The method and system implement an inertial unit having six sensors: three accelerometers and three gyrometers. Each sensor triad forms a spatial reference. Let's call here ($O_1$, x, y, z) the direct orthonormal reference system that is centred at $O_1$ on the inertial unit, and that includes the three x, y, z axes, and on which the measurements can be projected. The acceleration $\vec{a}_m$ and rotation $\vec{\omega}_m$ measurements produced by the inertial unit are thus referenced with respect to this reference system ($O_1$, x, y, z) and this reference system may be intrinsic/preestablished by construction or be settable. In the case of a settable inertial unit, the unit includes means for calculating a reference system change between its intrinsic/preestablished reference system and an alternative reference system, which is a setting data of the unit, the measurements produced by the inertial unit then corresponding to the alternative set reference system.

Any type of inertial unit may be implemented within the framework of the invention: for example a high-performance inertial unit to maintain a precise heading, a gyrocompass inertial unit or any other equivalent unit.

A gyrocompass inertial unit is capable of self-initializing/calibrating following a static phase whose typical duration is a few minutes. Preferably, a gyrocompass inertial unit is implemented.

The rail vehicle includes a body and two bogies, a front and a rear, on which are fastened axles. The bogies each have an axis of rotation with respect to the body in order to follow a curve defined by the railway. By convention, for the explanations, it will be considered that points $B_1$, $B_2$ (FIG. 1) correspond to the intersections between the axis of rotation of the front and rear bogies with a common rolling plane for the bogies. The rolling plane corresponds to the plane containing the areas of contact between the wheels of the axles and the rails. In the following, a rolling plane common to the two bogies will be considered but in a more evolved embodiment, it is possible to take into account each bogie rolling plane because they are not necessarily superposable, in particular in case of slope breaking or superelevation. It is hence considered for the following that $B_1$ and $B_2$ are fixed with respect to the body.

The vehicle including the system of the invention is schematized in FIGS. 1 and 2. In FIG. 1, the vehicle 1 has a body 10 rolling on rails 20 of a railway 2 thanks to two bogies 11, 11' each including two axles 12. The body 10 is longitudinally elongated. Each bogie 11, 11' is articulated to the body 10 by a rotation axis passing by the points $B_1$, $B_2$ located in a common rolling plane of the bogies. By construction, due to a certain symmetry of the vehicle, the rotation axes of the bogies, in the absence of stress, cross the main median anteroposterior axis of the body 10 and are in an anteroposterior/longitudinal and sagittal/vertical plane of the body 10.

By convention, the $x_c$ axis 14 of the body is colinear with the instantaneous velocity vector $\vec{v}_u$ of the vehicle 1 during a rectilinear travel with constant superelevation of the vehicle body. Such a rectilinear travel with constant superelevation makes it possible to determine this velocity vector because it is then identical in any point of the body. By convention, the $x_c$ axis is located in the common rolling plane for the bogies (see FIG. 2).

It can be observed that the line connecting the two points $B_1$ and $B_2$ of the two bogies is parallel to the $x_c$ axis. It is understood that the origin of the fixed reference system $x_c$, $y_c$, $z_c$ is not important and that the point $O_2$, which does not correspond to this origin, can move according to the movements of the roll axis. The segment $[B_1B_2]$ joining the two points $B_1$ and $B_2$ defines the inter-bogie distance $B_1B_2$ between the two bogies 11, 11', and a point I is considered in the middle of the segment $[B_1B_2]$. An inertial unit 3 is fixed at a determined point of the body 10 and is marked by the origin $O_1$ of the reference system $(O_1, x, y, z)$ of the measurements. The inertial unit 3 makes it possible to produce a velocity measurement symbolized by the velocity vector $\vec{v}_{O_1}$. Preferably, the inertial unit is fastened inside the body.

In FIG. 1, the railway 2 is curved, schematized by a circle arc and this curve has for radius $OB_1=OB_2$ by convention (the middle 23 of the railway 2 serves as a reference to define the radius of curvature). Each bogie 11, 11' has a velocity vector tangent to the middle 23 of the railway, respectively $\vec{v}_{B_1}$ for the bogie 11 of point $B_1$ and $\vec{V}_{B_2}$ for the bogie 11' of point $B_2$.

In FIG. 2, the body 10 of the vehicle 1 of FIG. 1 is shown in cross-section (perpendicular to the main median anteroposterior axis of the body and hence perpendicular to $x_c$), that is median (because passing through the point I, middle of $B_1B_2$). Given that the vehicle is on a curve, a superelevation of the railway is present. The railway is consisted of rails 20, on sleepers 21, resting on a ballast bed 22. By convention, the points $B_1$ and $B_2$ are located on the common rolling plane of the bogies and the $x_c$ axis and the point I are thus also present therein. It has also been shown in this example the point $O_2$ that is at the intersection between the body roll axis and the plane orthogonal to $x_c$ containing I. An axis 13, $IO_2$, is thus defined. It can be noted that it is possible to implement the invention using a point $O_2$ that is not exactly at the intersection between the body roll axis and the plane orthogonal to $x_c$ containing I. It is considered that a point $O_2$ located at a determined distance D, about said intersection between the body roll axis and the plane orthogonal to $x_c$ containing I, makes it possible to obtain satisfying results if D is typically lower than 1 m. It is understood that this distance D can be more or less reduced or increased as a function of the accuracy of the calculations for measuring or estimating the position of point $O_2$, of the railway layout that the rail vehicle is likely to encounter and of certain of its characteristics such as its inter-bogie distance, the inter-axle distance of its bogies and the effect of its suspensions. Therefore, for example, it may be provided that this point $O_2$ is at a point located in a sphere of radius 1 m centred on said intersection. Another shape than a sphere can be provided for the area of positioning of point $O_2$ about said intersection.

The inertial unit is installed in the body in such a way that, preferably, the x axis of measurement of the inertial unit reference system is parallel with an accuracy of at least 5° to the $x_c$ axis 14 of the rail vehicle body. This positioning in alignment is thus physically ensured at the time of the mechanical installation of the inertial unit in the body. It will be seen that this condition allows simplifications in the calculations and makes it possible to avoid a previous calibration phase for estimating the angulation between the x axis and the $x_c$ axis, then continuous processing of the measurements for correcting the angulation and for making said simplification. It is then understood that, in an alternative embodiment, it may be chosen not to position the inertial unit with the indicated accuracy of at least 5° and to implement the previous estimation phase and the subsequent corrections in continuous to move the axes closer in alignment by calculation.

Therefore, in alternative embodiments, this positioning in alignment may be performed by calculation in a settable inertial unit by choosing x colinear to the velocity vector it estimates. In other words, merging heading and stroke makes it possible to have, between the x axis and the $x_c$ axis 14, misalignment angles $\alpha$, $\beta$, lower than 5°. This positioning in alignment with an accuracy of at least 5° can also be made by calculation in the inertial unit and with the help of an external sensor such as a GNSS signal receiver.

The positioning of the two other axes y and z of the measurement reference system of the inertial unit 3 may be arbitrary. However, it is possible to roughly position the y axis in the plane or a plane parallel to the common rolling plane of the bogies, and/or the z axis substantially vertically. In practice, the z axis may move according to the rolling conditions, in particular, it is not vertical when the rails form a circular arc with a strong superelevation of the rails, which causes a roll of the body liable to reach 10°, the inertial unit being fastened to the body.

As regards the calculation method implemented in the estimator of the system, the virtual sensor of the estimator includes calculation means for calculating two theoretical transverse velocities $\delta v_{y_c}$ and $\delta v_{z_c}$. The estimator performs its calculations by iterations and under the constraint that these two theoretical transverse velocities $\delta v_{y_c}$ and $\delta z_{c_v}$ are zero.

The algorithm of the system operates with a global estimator of the Kalman filter type operating at an updating frequency $f_{maj}$ that is the frequency of the updating step.

This allows a better knowledge, on the one hand, of the inertial navigation magnitudes (in particular $\overrightarrow{v_{O_1}}$) and, on the other hand, of the inertial unit biases ($\vec{b_a}$, $\vec{b_\omega}$) and the installation parameters, ($\overrightarrow{O_1O_2}$, $\alpha$, $\beta$) or ($\overrightarrow{O_1O_2}$, $\alpha$, $\beta$, $B_1B_2$), proper to the virtual sensor during the correction step. Moreover, this also makes it possible to calculate the standard deviations of the different magnitudes and to thus provide an accuracy indicator for the output data, in particular for the velocity vector. The output data, including at least the instantaneous velocity vector $\vec{V_u}$, are provided at an output frequency $f_{sortie}$ that is a sub-multiple of $f_{pred}$ (frequency of the prediction step).

A way of calculating the instantaneous velocity and rotation vectors by the estimator according to certain hypotheses will now be described by way of example. This example does not exclude other calculation methods.

Firstly, an inertial navigation algorithm used in a step of predicting a prediction block performs integration of the inertial unit 3 gyrometer and accelerometer measurements at a prediction frequency $f_{pred}$ that is the frequency of the prediction step using directly the inertial unit measurements.

The inertial navigation algorithm is based in particular on the velocity differential equation expressed here in the inertial unit reference system:

$$\dot{\overrightarrow{v_{O_1}}} = \vec{a} + \vec{g} - (\vec{\omega} + 2\vec{\omega_t}) \times \overrightarrow{v_{O_1}}$$

with:
$\overrightarrow{v_{O_1}}$ the velocity vector of the point $O_1$ of the body;
$\vec{\omega_t}$ the rotation vector of the terrestrial reference system with respect to an inertial reference system;
$\vec{g}$ the earth gravity;
a the proper acceleration vector of the body corrected for the three accelerometer biases: $\vec{a} = \vec{a_m} + \vec{b_a}$, where $\vec{a_m}$ is the acceleration measurement by the three accelerometers of the inertial unit and $\vec{b_a}$ the biases of the three accelerometers;
$\vec{\omega}$ the rotation vector of the body with respect to the terrestrial reference system corrected for the biases of the three gyrometers: $\vec{\omega} = \vec{\omega_m} + \vec{b_\omega}$, where $\vec{\omega_m}$ is the rotation measurement by the three gyrometers of the inertial unit and $\vec{b_\omega}$ the biases of the three gyrometers.

The equation $$\dot{\overrightarrow{v_{O_1}}} = \vec{a} + \vec{g} - (\vec{\omega} + 2\vec{\omega_t}) \times \overrightarrow{v_{O_1}}$$

thus allows determining the velocity from the inertia unit measurements. However, these measurements from the inertial unit are subject to the three biases $\vec{b_a}$ from the accelerometers through $\vec{a}$ and the three biases $\vec{b_\omega}$ from the gyrometers through $\vec{\omega}$. These six measurement biases also have an impact on the orientation of the inertial unit reference system with respect to the Earth.

The virtual sensor, which is based on a model $M(\overrightarrow{O_1O_2}, \alpha, \beta, \overrightarrow{v_{O_1}}, \vec{\omega}, \delta v_{y_c}, \delta v_{z_c})$ of the vehicle, calculates the transverse velocities $\delta v_{y_c}$ and $\delta v_{z_c}$ along the $y_c$ and $z_c$ axes, based on $\overrightarrow{O_1O_2}$, $\alpha$, $\beta$, $\overrightarrow{v_{O_1}}$, $\vec{\omega}$. It may be noted that, knowing $\vec{\omega}$, it is possible to calculate the time variations of the rotation vector $\vec{\omega}$.

In the exemplary embodiment, the vehicle model is simplified in that the effect of bogie sliding with respect to the body, the effects of wheels conicity are neglected, in that the hypothesis of is made to consider the points $B_1$ and $B_2$ as being attached to the body and, finally, only a part of the effects of the primary and secondary suspensions is corrected, this correction concerning the roll. It is however understood that it is possible to implement a far more evolved model of the vehicle to take into account and correct this/these effect(s).

Despite the installation and an initialization phase, which correspond to an accurate mechanical installation and/or a software-implemented, considering that the heading is merged with the travel, during which it has been searched to align at best the x and $x_c$ axes, it remains a misalignment, generally lower than 5°, between the x and the $x_c$ axes. This misalignment corresponds to subsidiary misalignment angles $\alpha$, $\beta$, which may be estimated by the estimator. Indeed, it is the only velocity source along the two transverse axes $y_c$ and $z_c$ during a rectilinear travel with constant superelevation.

In addition to the misalignment between the x and $x_c$ axes, the virtual sensor admits certain biases that can be modelled by a model of the rail vehicle coupled to the study of the possible rail configurations. It is admitted that the curvatures that the rails may take are the following:

Null curvature: the vehicle circulates in straight line;
Non-zero constant curvature: circular arc curve;
Almost-linear variation of the curvature with a cubicle connection, such a curve corresponding to a development limited to order one of the clothoid whose curvature varies exactly linearly;
Discontinuous variation of the curvature at a switch.

The rail superelevation and declivity may also vary. In most cases, the superelevation is null in straight line and constant with a small angle in a circular arc curve in order to limit the lateral/centrifugal acceleration felt by a passenger of the vehicle. A superelevation generally appears during a cubicle connection.

In relation with FIG. 1, considering $B_1$ and $B_2$ fixed with respect to the body and the latter dimensionally stable, it is possible to write the following relations between velocities and rotation:

$$\begin{cases} \overrightarrow{v_{O_1}} = \overrightarrow{v_{B_1}} + \vec{\omega} \times \overrightarrow{B_1O_1} \\ \overrightarrow{v_{O_1}} = \overrightarrow{v_{B_2}} + \vec{\omega} \times \overrightarrow{B_2O_1} \end{cases}$$

Given that $\overrightarrow{B_1O_1} + \overrightarrow{B_2O_1} = 2\overrightarrow{IO_1}$, the mean of the two preceding relations make it possible to express the velocity $\overrightarrow{v_{O_1}}$ at $O_1$ from $\vec{\omega}$, $\overrightarrow{IO_1}$ and the velocities in $B_1$ and $B_2$, i.e.:

$$\overrightarrow{v_{O_1}} = \frac{1}{2}(\overrightarrow{v_{B_1}} + \overrightarrow{v_{B_2}}) + \vec{\omega} \times \overrightarrow{IO_1}$$

The velocities in $B_1$ and $B_2$ are considered tangent to the railway at the rolling plane.

The term $$\frac{1}{2}(\vec{v_{B_1}} + \vec{v_{B_2}})$$

admits the following transverse component according to the typology of the railway:

When a superelevation appears: $\vec{\omega} \times \vec{O_2I}$;
During a variation of the rail curvature or the declivity: $-\vec{\gamma}$, where $\vec{\gamma}$ depends on $\vec{v_{O_1}}$, the time variations of the rotation vector a and the inter-bogie distance $B_1B_2$.
This term $\vec{\gamma}$, which corresponds to a transient transverse velocity is optional and models the transient biases resulting from a cubicle connection or a switch;
The transverse components become null a constant curvature and during a linear variation of the declivity.

Therefore, it is possible to determine, from the vehicle model, a velocity $\vec{v_{mv}}$ that must theoretically be in the $x_c$ axis of the rail vehicle body and that is calculated by the following formula:

$$\vec{v_{mv}} = \vec{v_{O_1}} + \vec{\omega} \times \vec{O_1O_2} + \vec{\gamma}$$

The term $\vec{\omega} \times \vec{O_1O_2}$ allows taking into account a leverage arm between the virtual sensor supposed to be at point $O_2$ and the inertial unit.

The components of vector $\vec{O_1O_2}$ may be estimated in the estimator and/or be predetermined because measured at the time of installation of the inertial unit in the body and be part of predetermined installation parameters.

More generally, certain or all the installation parameters, $\vec{O_1O_2}$, α, β and the difference $B_1$ and $B_2$ may be predetermined by in-situ measurements on the vehicle and may be input into the estimator for initialization of the latter. These installation parameters, predetermined or not, are then estimated (for refining the predetermined parameters) by the estimator when the latter is operated for calculating the instantaneous velocity vector. In certain alternative embodiments, it is possible not to estimate the predetermined installation parameter(s) in the estimator and to perform the calculations with the corresponding predetermined values that are hence not refined.

Moreover, it is possible to consider only certain terms of the velocity calculation formula $\vec{v_{mv}}$. In particular, the term $\vec{\gamma}$ which is function of the inter-bogie distance $B_1B_2$ may not be taken into account. Therefore, as regards the inter-bogie distance $B_1B_2$, an installation parameter acting on the term $\vec{\gamma}$, it is possible not to take it into account in the estimator or, in case it is taken into account, a predetermined value that is not estimated by the estimator, or conversely that is estimated by the estimator, can be used.

More generally, it is understood that for initializing the installation parameters in the estimator, any useful value can be used and, advantageously, predetermined values resulting from in-situ measurements in order to allow, for the parameters estimated by the estimator, a faster convergence of the estimation.

As regards $\vec{O_1O_2}$, if $O_1$ is normally actually fixed with respect to the body due to the fact that the body is rigid and that the inertial unit is firmly and rigidly attached thereto, this is not necessarily the case of $O_2$, which may depend on the railway dynamics, in particular due, for example, to the presence of shock absorbers on either lateral side of the bogies, of liquid tanks whose liquids are liable to move. It is therefore particularly advantageous that the estimator estimates in continuous the components of the vector $\vec{O_1O_2}$.

As regards the misalignment between the x axis and the $x_c$ axis, it is also particularly advantageous that the estimator estimates in continuous the misalignment angles α, β. FIG. 3 shows the passage coordinate system $x_p$, $y_p$, $z_p$ between both of them as a function of the misalignment angles α, β. In FIG. 3, the angles are positive in the direction of direct rotation of the orthonormal reference system considered and angle α is thus positive and angle β is negative. The subsidiary misalignment angles α, β, are Euler angles making it possible to pass from x axis to $x_c$ axis in the following manner: rotation by an angle α about γ axis (left part in FIG. 3) and rotation by an angle α about $z_p$ axis (right part in FIG. 3). In other words, angle α is the heading misalignment angle between x axis and $x_c$ axis, and angle β is the pitch misalignment angle between x angle and $x_c$ angle. For the estimator, the calculations are the following: let's C(α,β) be the correction matrix of the misalignment angles α and β for the passage from x to $x_c$. This matrix is written:

$$C(\alpha, \beta) = \begin{pmatrix} \cos(\alpha)\cos(\beta) & \sin(\alpha) & -\cos(\alpha)\sin(\beta) \\ -\sin(\alpha)\cos(\beta) & \cos(\alpha) & \sin(\alpha)\sin(\beta) \\ \sin(\beta) & 0 & \cos(\beta) \end{pmatrix}$$

Using the following notations for expressing the different values in the inertial unit reference system:

$$\vec{v_{O_1}} = \begin{pmatrix} v_{O_{1x}} \\ v_{O_{1y}} \\ v_{O_{1z}} \end{pmatrix}; \vec{\omega} = \begin{pmatrix} \omega_x \\ \omega_y \\ \omega_z \end{pmatrix}; \vec{O_1O_2} = \begin{pmatrix} O_1O_{2x} \\ O_1O_{2y} \\ O_1O_{2z} \end{pmatrix}; \vec{\gamma} = \begin{pmatrix} 0 \\ \gamma_y \\ \gamma_z \end{pmatrix}; \vec{v_{mv}} = \begin{pmatrix} v_{mv_x} \\ v_{mv_y} \\ v_{mv_z} \end{pmatrix};$$

the velocities $\delta v_{y_c}$ and $\delta v_{z_c}$ at the exit of the virtual sensor may be calculated, by projection on the $y_c$ axes and $z_c$ axes, respectively, of the result of the product $$C(\alpha, \beta) \begin{pmatrix} v_{mv_x} \\ v_{mv_y} \\ v_{mv_z} \end{pmatrix} \text{ and}$$

where $\vec{v_{mv}} = \begin{pmatrix} v_{mv_x} \\ v_{mv_y} \\ v_{mv_z} \end{pmatrix}$ is given by: $\vec{v_{mv}} = \vec{v_{O_1}} + \vec{\omega} \times \vec{O_1O_2} + \vec{\gamma}$.

Knowing that |α|<5° and |β|<5°, as the inertial unit is installed in such a way that the x axis of the inertial unit is inclined at most in a cone of 5° with respect to the $x_c$ axis of the vehicle body, it is possible to express $\delta v_{y_c}$ and $\delta v_{z_c}$ as a function the terms of the $1^{st}$ order as follows:

$$\begin{cases} \delta v_{y_c} = -\alpha\left(v_{O_{1x}} + \omega_y O_1O_{2z} - \omega_z O_1O_{2y}\right) + \\ \quad v_{O_{1y}} + \omega_z O_1O_{2x} - \omega_x O_1O_{2z} + \gamma_y \\ \delta v_{z_c} = \beta\left(v_{O_{1x}} + \omega_y O_1O_{2z} - \omega_z O_1O_{2y}\right) + \\ \quad v_{O_{1z}} + \omega_x O_1O_{2y} - \omega_y O_1O_{2x} + \gamma_z \end{cases}$$

When the term $\vec{\gamma}$ is not taken into account, $\delta v_{y_c}$ and $\delta v_{z_c}$ are expressed as a function of the terms of the $1^{st}$ order as follows:

$$\begin{cases} \delta v_{y_c} = -\alpha\left(v_{O_{1_x}} + \omega_y O_1 O_{2_z} - \omega_z O_1 O_{2_y}\right) + \\ \qquad v_{O_{1_y}} + \omega_z O_1 O_{2_x} - \omega_x O_1 O_{2_z} \\ \delta v_{z_c} = \beta\left(v_{O_{1_x}} + \omega_y O_1 O_{2_z} - \omega_z O_1 O_{2_y}\right) + \\ \qquad v_{O_{1_z}} + \omega_x O_1 O_{2_y} - \omega_y O_1 O_{2_x} \end{cases}$$

It will e note t at the velocities $\delta v_{y_c}$ an $\delta v_{z_c}$ calculated in the vehicle model block depend particularly on $\vec{v}_{O_1}$, $\vec{\omega}$ estimated by the inertial navigation algorithm. The theoretical collinearity of the velocity $\delta v_{y_c}$ with the $\delta v_{z_c}$ axis must result in the nullity of the transverse velocities $\delta v_{y_c}$ and $\delta v_{z_c}$ whatever the vehicle movement because, by principle, the transverse velocities calculated by the virtual sensor are always null for a vehicle corresponding to the vehicle model.

In practice, the subsequent correction step performed in the correction calculation module consists in applying the following relation:

$$\begin{cases} \delta v_{y_c} = \varepsilon_{y_c} \\ \delta v_{z_c} = \varepsilon_{z_c} \end{cases}$$

where the terms $\varepsilon_{y_c}$ and $\varepsilon_{z_c}$ come from the phenomena not taken into account by the vehicle model used, such as suspension effects.

These terms $\varepsilon_{y_c}$ and $\varepsilon_{z_c}$ can for example be modelled by Gaussian white noises of null mean. Their standard deviations are not necessarily equal and may be fixed or depend on the railway dynamics that makes the accuracy of each measurement different.

Instantaneous transverse velocities $\delta v_{y_c}$ and $\delta v_{z_c}$ can be calculated. But, in the case where $f_{pred} > f_{maj}$, it is possible to calculate $\delta v_{y_c}$ and $\delta v_{z_c}$ (from these same values $\vec{v}_{O_1}$, $\vec{\omega}$) integrated over the time pitch $$\frac{1}{f_{maj}}$$

with $f_{maj}$ the frequency of the updating step, which allows reducing the measurement noise. The same correction equation is then applied.
Coupling the Equations $$\begin{cases} \delta v_{y_c} = \varepsilon_{y_c} \\ \delta v_{z_c} = \varepsilon_{z_c} \end{cases}$$

and $$\dot{\vec{v}_{O_1}} = \vec{a} + \vec{g} - (\vec{\omega} + 2\vec{\omega_t}) \times \vec{v_{O_1}}$$

in the estimator makes it possible to isolate and observe especially the following parameters:

The misalignment angles $\alpha$ and $\beta$ as well as the biases $b_\alpha$ of the accelerometers along y and z axes during a rectilinear travel of constant superelevation;

The leverage arm $O_1 O_{2_x}$ and the bias $\vec{b}_a$ of the accelerometer along x axis during a travel of non-zero curvature or during a slope change;

The leverage arms $O_1 O_{2_y}$ and $O_1 O_{2_z}$ during a superelevation change;

The inter-bogie distance $B_1 B_2$ during a passage over a diverging switch or a cubicle connection;

The succession of the different railway configurations also makes it possible to observe the biases $\vec{b}_\omega$ of the three gyrometers.

It is reminded that the inter-bogie distance $B_1 B_2$, acting on the term $\vec{\gamma}$, is an installation parameter that may be taken into account in the estimator on an optional basis.

It is understood that, generally, increasing the travel length and the number of rail configurations met improves the observability of the six sensors biases and of the different parameters of the vehicle model, including the installation parameters. These observations strongly improve the velocity vector measurement that provides the rail vehicle movement vector after integration. For calculations and estimations, the estimator does not need to know the type of the rail on which the vehicle circulates.

It is therefore preferable that the vehicle travels a sufficiently varied route to encounter these different railway configurations in order to determine the installation parameters and the biases of the inertial unit.

The calculations regarding more precisely the estimator and the Kalman filter used in the example described will now be described in detail in relation with FIG. 4.

As regards the state of the extended Kalman filter at time instant k, the latter is represented by the estimation of the state vector $\hat{x}_{k|k}$ and the associated covariance matrix $P_{k|k}$. The state vector in the general case taking into account the term $\vec{\gamma}$ is defined by the following expression:

$$\hat{x} = (\underbrace{\vec{r_{O_1}}, \vec{v_{O_1}}, \psi, \theta, \phi, \vec{b_a}, \vec{b_\omega}}_{(15 \times 1)} | \underbrace{\alpha, \beta, \vec{O_1 O_2}}_{(5 \times 1)} | \underbrace{B_1 B_2}_{(1 \times 1)}) \quad (21 \times 1)$$

with:

$\vec{r_{O_1}}$: the position of point $O_1$ of the body in the terrestrial reference system (3×1);

$\vec{V_{O_1}}$: the velocity vector of point $O_1$ of the body (3×1);

$\psi, \theta, \phi$: the heading, roll, pitch angles (3×1);

$\vec{b_a}$: the biases of the three accelerometers (3×1);

$\vec{b\omega}$: the biases of the three gyrometers (3×1);

$\alpha$: the heading misalignment angle (1×1);

$\beta$: the pitch misalignment angle (1×1);

$\vec{O_1 O_2}$: the leverage arm between the inertial unit and the virtual sensor (3×1);

$B_1 B_2$: the inter-bogie distance (1×1).

During the prediction step, the state of the extended Kalman filter is obtained as follows:

$$\hat{x}_{k|k-1} = f(\hat{x}_{k-1|k-1}, \vec{a_m}, \vec{\omega_m})$$

$$P_{k|k-1} = F_k P_{k-1|k-1} F_k^T + Q_k$$

with:

$f$, the function used to predict the estimation of the state vector $\hat{x}_{k|k-1}$ from the estimation of the preceding state vector $\hat{x}_{k|k-1}$ and the inertial measurements $\vec{a_m}, \vec{\omega_m}$. This function performs in particular the differential velocity equation integration;

$\vec{a}_m$: the measurement by the inertial unit accelerometers of the body own accelerations (3×1), the vector of the body own accelerations corrected for the three accelerometer biases being such that $\vec{a} = \vec{a}_m + \vec{b}_a$;

$\vec{\omega}_m$: the measurement by the three inertial unit gyrometers of the body rotation vector with respect to the terrestrial reference system (3×1), the body rotation vector with respect to the terrestrial reference system corrected for the biases $\vec{b}_\omega$ of the three gyrometers being such that: $\vec{\omega} = \vec{\omega}_m + \vec{b}_\omega$;

$$F_k = \frac{\partial f}{\partial x}\bigg|_{\hat{x}_{k-1|k-1}} = \begin{pmatrix} F^1_{k_{15\times 15}} & 0_{15\times 5} & 0_{15\times 1} \\ 0_{5\times 15} & I_{5\times 5} & 0_{5\times 1} \\ 0_{1\times 15} & 0_{1\times 5} & I_{1\times 1} \end{pmatrix},$$

the Jacobian matrix of the function $f$ making it possible to predict the covariance estimation $P_{k|k-1}$ from the preceding covariance estimation $P_{k-1|k-1}$;

$$Q_k = \begin{pmatrix} Q^1_{k_{15\times 15}} & 0_{15\times 5} & 0_{15\times 1} \\ 0_{5\times 15} & Q^2_{5\times 5} & 0_{5\times 1} \\ 0_{1\times 15} & 0_{1\times 5} & Q^3_{1\times 1} \end{pmatrix},$$

the covariance matrix of the prediction noise where $Q_{k_{15\times 15}}^1$ models the measurement noises of the inertial unit.

It is to be noted that, in the case where the states linked to the virtual sensor ($\alpha$, $\beta$, $O_1O_2$, $B_1B_2$) are supposed to converge towards a constant value, the covariance matrices of the noise of prediction of these states are such that $Q_{5\times 5}^2 = 0_{5\times 5}$ and $Q_{1\times 1}^3 = 0_{1\times 1}$. It is nevertheless known that the position of the body roll axis varies as a function of the railway dynamics. Indeed, this position depends especially on the effect of the suspensions as well as on the rail layout during a superelevation that is generally caused by a raising of the external rail. It may thus be interesting to minor the standard deviations of the lever arm states $\vec{O_1O_2}$ using a suitable value for the matrix $Q_{5\times 5}^2$.

The velocity vector $\vec{v}_{O_1}$ depends on the biases of the inertial sensors ($\vec{b}_a$, $\vec{b}_\omega$) through the function $f$ as well as the states linked to the virtual sensor ($\alpha$, $\beta$, $\vec{O_1O_2}$, $B_1B_2$) through the corrections following the preceding measurements. During the updating step, the state of the Kalman filter is obtained as follows:

$$\tilde{\gamma}_k = z_k - h(\hat{x}_{k|k-1}, \omega m)$$

$$S_k = H_k P_{k|k-1} H_k^T + R_k$$

$$K_k = P_{k|k-1} H_k^T S_k^{-1}$$

$$\hat{x}_{k|k} = \hat{x}_{k|k-1} + K_k \tilde{y}_k$$

$$P_{k|k} = (I_{21\times 21} - K_k H_k) P_{k|k-1}$$

with:

$$z_k = \begin{pmatrix} 0 \\ 0 \end{pmatrix},$$

the measurement of zero transverse velocities of the virtual sensor, $$h(\hat{x}_{k|k-1}, \vec{\omega_m}) = \begin{pmatrix} \delta v_{y_c}(\hat{x}_{k|k-1}, \vec{\omega_m}) \\ \delta v_{z_c}(\hat{x}_{k|k-1}, \vec{\omega_m}) \end{pmatrix},$$

the function used by the virtual sensor to estimate the transverse velocities from the estimation of the predicted state vector. It is to be noted that the vector $\vec{\gamma}$ used by the function h depends on $\vec{v}_{O_1}$, and on the inter-bogie distance $B_1$, $B_2$.

$$H_k = \frac{\partial h}{\partial x}\bigg|_{\hat{x}_{k|k-1}},$$

the Jacobian matrix of the function h, $$R_k = \begin{pmatrix} \varepsilon_{y_c} & 0 \\ 0 & \varepsilon_{z_c} \end{pmatrix},$$

the covariance matrix of the measurement noise of the virtual sensor. In the simplest case, this noise is configured in such a way that $\varepsilon_{y_c}$ and $\varepsilon_{z_c}$ are constant and equal to each other. They represent the variance of the measurement noise, this noise being supposed to be white and Gaussian. In a more elaborated case, this noise can depend on an input such as $\vec{a}_m$ or the time variations of $\vec{\omega}$, the error being higher in case of strong dynamics after effects of non-modelled suspension or an unusual geometry of the rails. Within the framework of an adaptive filtering, the value of the parameters $\varepsilon_{y_c}$ and $\varepsilon_{z_c}$ at step k may also depend on the magnitudes of the residues calculated above, directly obtained from the innovations $\tilde{\gamma}_{k-i}$ with $0 \leq i \leq k$.

For practical applications, the vectors $\vec{a}_m$, $\vec{\omega}_m$ are produced and the prediction step is repeated at a prediction frequency $f_{pred}$ which may be of 100 Hz, for example. The calculation of the time variations of $\vec{\omega}$ from the measurements $\vec{\omega}_m$ is made by the virtual sensor within the framework of the updating step made at a lower frequency $f_{maj}$ which may be of 1 Hz. The output frequency of the instantaneous velocity vector $\vec{V}_u$ and of potential other output parameters calculated may be any frequency or sub-frequency of the prediction frequency $f_{pred}$, for example 100 Hz, 10 Hz or 1 Hz.

Due to certain neglected effects proper to the railway dynamics, the zero measurements of the two transverse velocities of the virtual sensor are imperfect. It is possible to elaborate an error model that is more complex than a simple white noise for the virtual sensor measurement errors, based in particular on additional terms in the state factors of the Kalman filter.

Thanks to the invention, the inertial unit may be installed at any place in the vehicle body, because the installation biases are corrected with the calculation of $\delta v_{y_c}$ and $\delta v_{z_c}$.

The main function of the system in nominal mode is to provide the instantaneous velocity vector $\vec{V}_u$ of the rail vehicle. In a more evolved embodiment, the instantaneous rotation vector $\vec{\omega}_u$ is also calculated by the estimator. Other modes are possible, for example to provide the vehicle movement vector. The movement is obtained by integration of the instantaneous velocity vector $\vec{V}_u$ calculated. In addition to the system, and associated with the method, information from other sensors can be used, as for example those of a global positioner ("GNSS"), an auxiliary physical velocity or travelled-distance sensor, and/or information from a database such as the railway map to improve the accuracy of the results calculated at the estimator output, including the instantaneous velocity vector $\vec{V}_u$, and in particular when the geographical position of the rail vehicle is calculated, which requires to have complementary data.

An extended Kalman filter is implemented in the exemplary embodiment detailed hereinabove, but in other embodiments, an unscented Kalman filter or any other estimator including a prediction step and an updating step may be used.

The invention claimed is:

1. A method for calculating, by an estimator, an instantaneous velocity vector, $\vec{V}_u$, of a rail vehicle capable of moving along a railway, the vehicle having a body, the body being arranged on two bogies, the bogies having wheel axles rolling on rails of the railway, the contacts of the wheels on the rails defining a rolling plane of the vehicle, each bogie being articulated to the body at least in rotation about a rotation axis, the body being capable of undergoing a roll movement about a roll axis, the estimator receiving as an input measurements from an inertial unit installed at a fixed point of the body, the inertial unit comprising accelerometers and gyrometers and making it possible to produce measurements in an orthonormal reference system x, y, z centred on a point $O_1$ located in the inertial unit, the estimator calculating as an output the instantaneous velocity vector $\vec{V}_u$, of the rail vehicle, wherein:

with $B_1$ and $B_2$ two points located at the intersections of the rotation axes of the bogies and the rolling plane of the vehicle, with $x_c$, $y_c$, $z_c$, a fixed orthonormal reference system of the vehicle body in which $x_c$ corresponds to a longitudinal axis of the body, passing through points $B_1$ and $B_2$, said $x_c$ axis being colinear to the vehicle instantaneous velocity vector $\vec{V}_u$ during a rectilinear travel with constant superelevation of the vehicle, a mathematical model M of the dynamics of the vehicle moving on a railway is determined, said model being function of biases of the inertial unit and of installation parameters, on the basis of model M, a virtual sensor is determined, making it possible to calculate, from parameters of the model, two theoretical transverse velocities, $\delta v_{y_c}$ along $y_c$ axis and $\delta v_{z_c}$ along $z_c$ axis, an iterative estimator for calculating the instantaneous velocity vector $\vec{V}_u$, and comprising the virtual sensor is implemented, the estimator being configured in such a way that the two theoretical transverse velocities are zero whatever the railway configuration, the estimator making it possible to correct the inertial unit biases and to estimate installation parameters, wherein an auxiliary physical velocity or travelled-distance sensor is implemented for calculating the instantaneous velocity vector $\vec{V}_u$, and wherein, the virtual sensor is determined based on a model $M(\overrightarrow{O_1O_2}, \alpha, \beta, \vec{v}_{O_1}, \delta v_{y_c}, \delta v_{z_c})$ of the vehicle, and the parameters enabling the virtual sensor to calculate the two theoretical transverse velocities are:

$O_1O_2$, the vector connecting point $O_1$ to point $O_2$ where point $O_2$ is a point considered located at the intersection between the body roll axis and a plane orthogonal to $x_c$ located at equal distance of the two points $B_1$ and $B_2$, or is a point considered close to said intersection, said point $O_2$ being then a point located at a determined distance D about said intersection of the body roll axis and the plane orthogonal to $x_c$ located at equal distance from the two points $B_1$ and $B_2$, D being lower than 1 m, $\alpha$, the heading misalignment angle between x axis and $x_c$ axis, $\beta$, the pitch misalignment angle between x axis and $x_c$ axis, a velocity vector $\vec{v}_{O_1}$ at point $O_1$, a rotation vector $\vec{\omega}$ of the body with respect to the terrestrial reference system, the parameters $O_1O_2$, $\alpha$, $\beta$ being the installation parameters, the estimator making it possible to correct the biases created by the inertial unit both by the misalignment angles $\alpha$, $\beta$, and by the leverage arm $\overrightarrow{O_1O_2}$.

2. The method according to claim 1, wherein the inertial unit is installed in the vehicle body in such a way that the x axis of the inertial unit is inclined at most in a cone of 5° with respect to the $x_c$ axis of the vehicle body, or else a previous calibration is performed, and then, during the calculation of at least the instantaneous velocity vector $\vec{V}_u$ by the estimator, the inertial unit measurements are processed in such a way that the measurements produced by the inertial unit and processed correspond to those of an inertial unit that would have been installed in such a way that the x axis of the inertial unit is inclined at most in a cone of 5° with respect to the $x_c$ axis of the vehicle body.

3. The method according to claim 2, wherein $\delta v_{y_c}$ and $\delta v_{z_c}$ are calculated on the basis of a model $M(\overrightarrow{O_1O_2}, \alpha, \beta, \vec{v}_{O_1}, \delta v_{y_c}, \delta v_{z_c})$ of the vehicle, by:

$$\begin{cases} \delta v_{y_c} = -\alpha\left(v_{O_{1_x}} + \omega_y O_1 O_{2_z} - \omega_z O_1 O_{2_y}\right) + \\ \quad v_{O_{1_y}} + \omega_z O_1 O_{2_x} - \omega_x O_1 O_{2_z} \\ \delta v_{z_c} = \beta\left(v_{O_{1_x}} + \omega_y O_1 O_{2_z} - \omega_z O_1 O_{2_y}\right) + \\ \quad v_{O_{1_z}} + \omega_x O_1 O_{2_y} - \omega_y O_1 O_{2_x} \end{cases}.$$

4. The method according to claim 3, wherein the estimator further calculates one or several of: an instantaneous rotation vector $\vec{\omega}_u$, a movement of the vehicle, a position of the vehicle, an attitude of the vehicle, standard deviations of the values calculated by the estimator.

5. The method according to claim 3, wherein at least one of the installation parameters $\overrightarrow{O_1O_2}$, $\alpha$ and $\beta$, and potentially $B_1B_2$, is initialized in the estimator by a measurement of the in-situ parameter in the vehicle body.

6. The method according to claim 3, wherein an estimator including a Kalman filter is implemented.

7. The method according to claim 3, wherein a gyrocompass inertial unit is implemented.

8. The method according to claim 2, wherein the parameters enabling the virtual sensor to calculate the two theoretical transverse velocities $\delta v_{y_c}$ and $\delta v_{z_c}$ further include the inter-bogie distance $B_1B_2$, and wherein $\delta v_{y_c}$ and $\delta v_{z_c}$ are calculated on the basis of a model $M(O_1O_2, \alpha, \beta, B_1B_2, \vec{v}_{O_1}, \delta v_{y_c}, \delta v_{z_c})$ of the vehicle, by:

$$\begin{cases} \delta v_{y_c} = -\alpha\left(v_{O_{1_x}} + \omega_y O_1 O_{2_z} - \omega_z O_1 O_{2_y}\right) + \\ \quad v_{O_{1_y}} + \omega_z O_1 O_{2_x} - \omega_x O_1 O_{2_z} + \gamma_y \\ \delta v_{z_c} = \beta\left(v_{O_{1_x}} + \omega_y O_1 O_{2_z} - \omega_z O_1 O_{2_y}\right) + \\ \quad v_{O_{1_z}} + \omega_x O_1 O_{2_y} - \omega_y O_1 O_{2_x} + \gamma_z \end{cases}$$

where $\gamma$ corresponds to a transient transverse velocity depending on $\vec{v}_{O_1}$, the time variations of $\vec{\omega}$ and of the inter-bogie distance $B_1B_2$.

9. The method according to claim 8, wherein the estimator further calculates one or several of: an instantaneous rotation vector $\vec{\omega}_u$, a movement of the vehicle, a position of the vehicle, an attitude of the vehicle, standard deviations of the values calculated by the estimator.

10. The method according to claim 8, wherein at least one of the installation parameters $\overrightarrow{O_1O_2}$, $\alpha$ and $\beta$, and potentially $B_1B_2$, is initialized in the estimator by a measurement of the in-situ parameter in the vehicle body.

11. The method according to claim 8, wherein an estimator including a Kalman filter is implemented.

12. The method according to claim 8, wherein a gyrocompass inertial unit is implemented.

13. The method according to claim 1, wherein the estimator further calculates one or several of: an instantaneous rotation vector $\vec{\omega}_u$, a movement of the vehicle, a position of the vehicle, an attitude of the vehicle, standard deviations of the values calculated by the estimator.

14. The method according to claim 13, wherein at least one of the installation parameters $O_1O_2$, $\alpha$ and $\beta$, and potentially $B_1B_2$, is initialized in the estimator by a measurement of the in-situ parameter in the vehicle body.

15. The method according to claim 13, wherein an estimator including a Kalman filter is implemented.

16. The method according to claim 1, wherein at least one of the installation parameters $O_1O_2$, $\alpha$ and $\beta$, and potentially $B_1B_2$, is initialized in the estimator by a measurement of the in-situ parameter in the vehicle body.

17. The method according to claim 1, wherein, in the estimator, the virtual velocity sensor is configured to calculate instantaneous transverse velocities or, then, transverse velocities integrated over the duration $$\frac{1}{f_{maj}}$$

of the updating step, with $f_{maj}$ the estimator updating frequency.

18. The method according to claim 1, wherein an estimator including a Kalman filter is implemented.

19. The method according to claim 1, wherein a gyrocompass inertial unit is implemented.

20. A system for calculating an instantaneous velocity vector, $\vec{V}_u$, of a rail vehicle capable of moving along a railway, the vehicle having a body, the body being arranged on two bogies, the bogies having wheel axles rolling on rails of the railway, the contacts of the wheels on the rails defining a rolling plane of the vehicle, each bogie being articulated to the body at least in rotation about a rotation axis, the body being capable of undergoing a roll movement about a roll axis, the system comprising an estimator of the instantaneous velocity vector, $\vec{V}_u$, the estimator being configured to calculate as an output the instantaneous velocity vector $\vec{V}_u$, of the rail vehicle according to the method of claim 1, the estimator receiving as an input measurements from an inertial unit installed at a fixed point of the body, the inertial unit comprising accelerometers and gyrometers and making it possible to produce measurements in an orthonormal reference system x, y, z centred at a point $O_1$ located in the inertial unit, wherein:
  with $B_1$ and $B_2$ two points located at the intersections of the rotation axes of the bogies and the rolling plane of the vehicle,
  with $x_c$, $y_c$, $z_c$, a fixed orthonormal reference system of the vehicle body in which $x_c$ corresponds to a longitudinal axis of the body, passing through points $B_1$ and $B_2$, said $x_c$ axis being colinear to the vehicle instantaneous velocity vector $\vec{V}_u$ during a rectilinear travel with constant superelevation of the vehicle,
  the system estimator is an iterative estimator that includes a virtual sensor determined on the basis of a mathematical model M of the dynamics of the vehicle moving on a railway, said model being function of biases of the inertial unit and of installation parameters, the virtual sensor making it possible to calculate, from model parameters, two theoretical transverse velocities, $\delta v_{y_c}$ along the $y_c$ axis and $\delta v_{z_c}$ along the $z_c$ axis, the estimator being configuration in such a way that the two theoretical transverse velocities are zero whatever the rail configurations, the estimator making it possible to correct the inertial unit biases and to estimate installation parameters, and the system having no auxiliary physical velocity or travelled-distance sensor to calculate the instantaneous velocity vector $\vec{V}_u$.

\* \* \* \* \*